United States Patent [19]
Martinez

[11] Patent Number: 5,111,337
[45] Date of Patent: May 5, 1992

[54] ENHANCED CONTRAST, MAXIMUM GAIN FRONT AND REAR PROJECTION SCREENS

[76] Inventor: Eugene Martinez, Woodbine Rd., Irvington, N.Y. 10533

[21] Appl. No.: 638,363

[22] Filed: Jan. 4, 1991

[51] Int. Cl. ............................................. G03B 21/56
[52] U.S. Cl. .................................................. 359/443
[58] Field of Search ......... 350/117, 123, 124, 126–129

[56] References Cited

U.S. PATENT DOCUMENTS

| | | | |
|---|---|---|---|
| 3,811,750 | 5/1974 | Coulthard | 350/117 |
| 3,844,644 | 10/1974 | Martinez | 350/117 |
| 4,201,449 | 5/1980 | Campion et al. | 350/117 |
| 4,792,209 | 12/1988 | Laine et al. | 350/117 |

OTHER PUBLICATIONS

Letraset Graphic Materials Handbook, copyright 1987, pp. 239, 240, 242, 243, 246, 249, 250, 253.

Primary Examiner—L. T. Hix
Assistant Examiner—D. Rutledge
Attorney, Agent, or Firm—Darby & Darby

[57] ABSTRACT

A method of printing a translucent coating onto the film backing portion of front or rear projection screens to provide an economical and efficient process of obtaining sharper definition and maximized gain, both of which can be varied in form and substitutent content depending on the amount of ambient light present in the environment in which these screens will be used. Additionally, front and rear projection screens are disclosed which have enhanced optical contrast provided by unique patterns printed onto a film backing.

54 Claims, 2 Drawing Sheets

ENHANCED CONTRAST, MAXIMUM GAIN FRONT AND REAR PROJECTION SCREENS

FIELD OF THE INVENTION

This invention relates generally to projection screens, and more particularly to front or rear diffusion projection screens having a pigment distributed evenly throughout the screen.

BACKGROUND OF THE INVENTION

Projection screens come in two basic forms, front projection and rear projection screens. The front projection screen has the light source on the same side from which image is viewed. The rear projection screen has the projection source on the opposite side from which the image is viewed.

Front projection screens have at least one layer which is opaque or reflective so that projected light returns to the viewer, while rear projection screens are either transparent or translucent so that projected light travels through the screen to the viewer. By way of example, a flat, white wall would be the simplest front projection screen, while a traditional view camera can be considered a simple rear projector. The present invention is directed to embodiments for both front and rear projection screens.

The camera obscura was the earliest known front projection screen, consisting of a flat white surface that required an absolutely pitch dark room. Since then countless fabrics, paints, plastics and metals have been used in various combinations as projection surfaces for viewing light projected images.

The original rear projection or "diffusion" screen was comprised of translucent ground glass and was first used to compose and focus the picture on the back of view cameras. The state of the art progressed to sprayed coatings applied to the face of a glass or clear plastic sheet, which was then installed in a framed opening in an enclosure.

More recently, pigments that were previously used to spray onto glass or clear plastic sheets have been mixed directly with the formative ingredients before the sheets are cast. These methods, currently used in the art, are complicated and difficult to perform, requiring expensive and sophisticated techniques.

The difficulties arise because even distribution of the pigments in the sheet matrix, whether cast or sprayed, is extremely hard to achieve. Even disbursement of pigment is a critical requirement because rear projection screens must have an evenly translucent quality over it's entire surface to form a clear image for the viewer. Unlike front projection screens, rear screens do not have a reflective surface layer and are dependant on the pigments to form suitable images for the viewer.

A further problem associated with prior art screens of the type under consideration is due to the fact that the picture image seen on a conventional screen is produced by projected light. The "bright" portions of the picture are derived primarily from the projected light which passes, for instance, through the transparent portions of slide film, while the "dark" parts of the picture are, in effect, the absence of light caused by the opaque portions of the film which block light from the projector. The degree of darkness in the projection room or theater controls the degree of darkness in the formed image. Alternatively, where there is more ambient light available, there is a lesser differentiation between dark and light portions. Thus, the richness of the variation between the dark and bright portions of a projected image comes from the differences in the amount of light projected versus the amount of darkness in the viewing room. This is referred to as "contrast."

As a general rule, the simpler the construction of the screen, the more darkness is required for sharper contrast. Any amount of ambient light tends to weaken the contrast of the image on the screen. Thus, when someone admits daylight into a movie theatre by opening a side door, the picture "washes" out because the dark portions now reflect light. In such situations, contrast can be enhanced by adding "blackness" to the screen.

Currently, one way of accomplishing this is by interweaving black and silver fibrous strands to form a front projection screen which contains finely alternating black, dark areas interwoven with silver, reflective areas. For rear projection screens, blackness is added by initially casting a molded screen surface creating subtle, alternating protrusions and depressions. Blackness is then applied only to the protruding areas of the screen surface.

However, these methods, currently used in the art, are complex and difficult to perform, requiring expensive and sophisticated techniques. The difficulties arise because even distribution of the dark areas whether interwoven or applied to cast-molded screens is extremely hard to achieve.

OBJECTS OF THE PRESENT INVENTION:

It is therefore an object of the present invention to provide an improved projection screen.

A more specific object of the present invention is to provide a projection screen that includes pigment uniformly distributed throughout the screen.

A further object of the present invention is to provide a projection screen with improved contrast.

A still further object of the present invention is to provide a projection screen with enhanced optical qualities.

Another object of the present invention is to provide a simple and efficient method of fabricating a projection screen of the type described.

SUMMARY OF THE INVENTION

A screen manufactured in accordance with the present invention includes a thin, transparent or translucent film. A translucent coating is printed onto an exposed surface of the film. The film may be supported by a substrate to permit ease of handling and positioning of the screen.

The method of the present invention includes providing a thin film and printing a translucent coating thereon. Thereafter, the film may be attached to a supporting substrate. Additionally, a preselected pattern may be printed on the film to increase the contrast properties of the screen. It should be noted that a supporting substrate is not essential to the present invention, the film alone being sufficient for printing both the pigment and the preselected pattern.

The above and other features and advantages of the present invention will become more apparent from a consideration of the following detailed description, when taken in conjunction with the accompanying drawings, in which:

DETAILED DESCRIPTION

Figure 1:
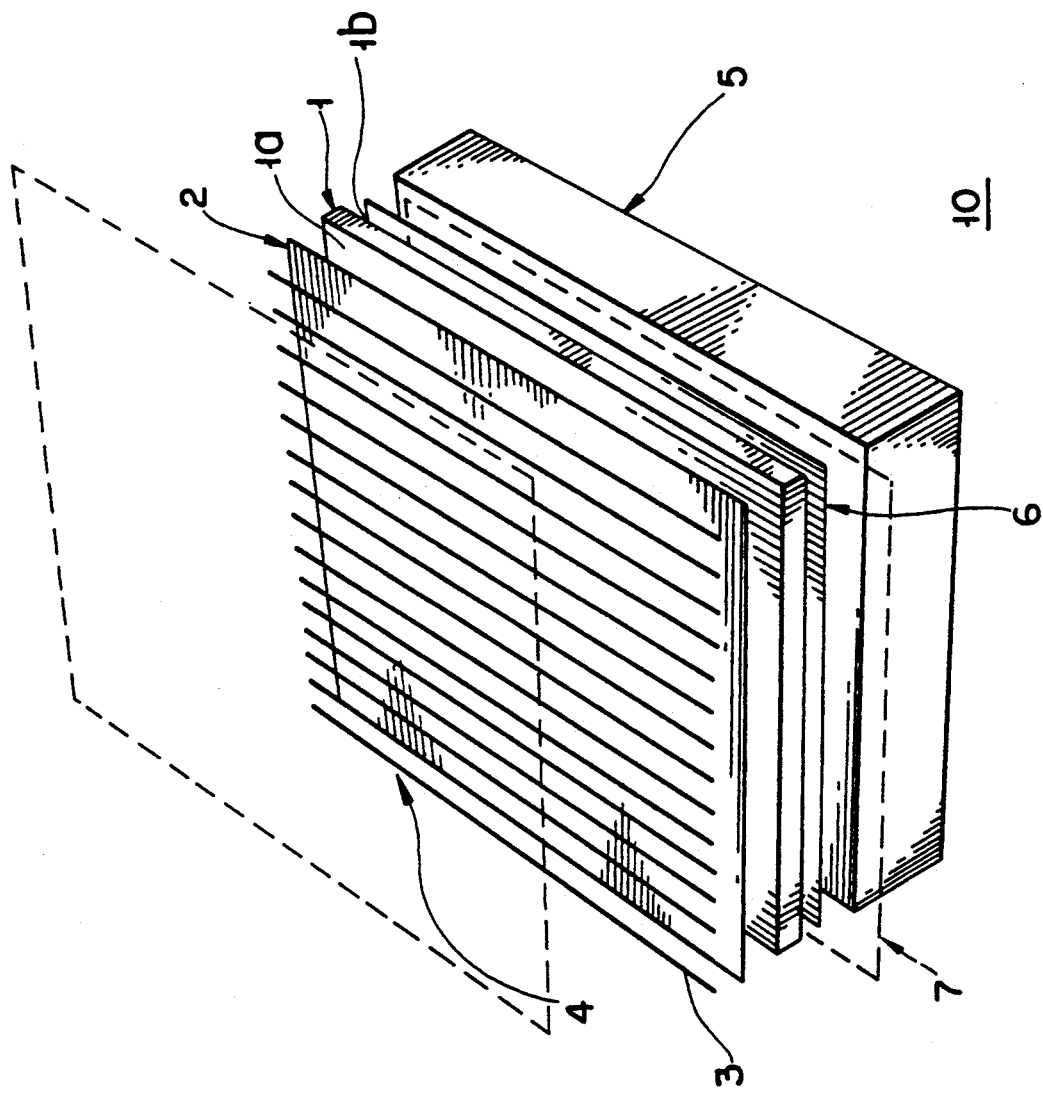
FIG. 1 is an exploded perspective diagrammatic view of a screen constructed according to the present invention.
Figure 2D:
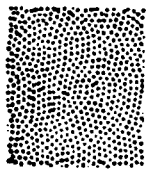
FIGS. 2 (a) through 2 (j) shows different patterns that may be utilized in the screen of the present invention to increase the contrast thereof.
Figure 2H:
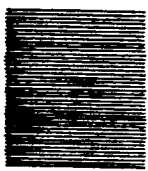
Figure 2C:
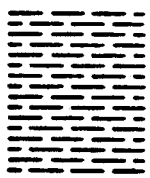
Figure 2G:
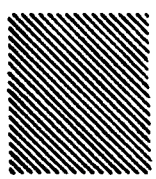
Figure 2B:
Figure 2F:
Figure 2J:
Figure 2A:
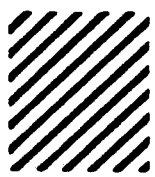
Figure 2E:
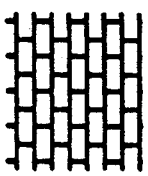
Figure 2I:
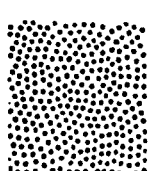

Referring to FIG. 1, a projection screen constructed according to the present invention is designated generally by the reference numerical 10 and comprises a thin transparent or translucent plastic film 1 having an upper surface 1a onto which a translucent, milky, coating 2 has been printed. Thus, by printing the coating 2 on the thin film 1, the pigment is uniformly distributed over the entire surface of the film thereby eliminating the optically uneven translucent areas that were inherent in prior art constructions.

If it is also desired to increase the contrast properties of the screen of FIG. 1, a very fine continuous black hair line pattern 3 may be printed on the coating 2. Whether or not pattern 3 is provided, a final protective coating 4 (shown in phantom lines) is applied to printed surface 1a to make the same scuff and scratch resistant to protect optical coating layer 2. Suitable materials for coating 4 include water soluble resins.

As shown in FIG. 1, pattern 3 comprises spaced parallel black lines. However, the invention is not limited to this pattern. Thus, FIG.'S 2(a) through 2(j) illustrate other possible patterns that can be printed onto film 1 to enhance contrast, as noted in greater detail below.

The important criteria for these patterns is that they have to be printed in a manner or pattern that achieves the contrast required, either uniformly over the entire surface of the film, or only in specific areas, for example, to balance the difference in brightness inherent in man optical systems between the center and corners of a projected image. Thus, in certain instances, uniform distribution of a preselected pattern is desirable, while in other situations, an irregular distribution of patterns may be required, for instance, to compensate for differences in brightness found between different portions of a projected image.

In a rear projection screen construction, the film 1 can be applied or laminated to a clear, transparent substrate 5 for support. Transparent substrate 5 can be either rigid or flexible depending on the application of the screen. When such substrates are added, a transparent or translucent adhesive coating 6 is applied to the rear surface of film 1 to connect together film 1 and substrate 5.

Substrate 5 need not be transparent for a front projection screen construction. In either front or rear screen types, substrate 5 is not essential to the practice of the present invention. However, the substrate, when included, provides sturdy support and improved ease of handling and positioning for the screens, which may be desirable in certain situations as will be apparent to one skilled in the art.

The screens of the present invention are basically produced with a very thin film 1 as the starting construction layer. Transparent or translucent plastics suitable for such film include polyesters, polyvinyls, polyamides and the like.

Conventional pigments known to those skilled in the art are printed onto film 1. Pigmenting agents which form a milky-white appearance on the film, once printed, are preferred. Conventional printing procedures such as those utilized for adding color pigments to film are employed to print the pigments directly onto film 1 to form the pigment coating layer 2.

As noted above, the simple pigment printing step allows even optical distribution of such pigments onto the screens of the present invention without the need for complex techniques for mixing pigments into cast plastic sheets. Additionally, the printing process permits uniform, even distribution of the pigment and eliminates optically uneven translucent areas associated with earlier screen constructions.

The rear projection screen film can be used in a number of different ways. The device can be used by itself. It can be laminated to a flexible transparent backing support and stretched on a portable frame. Alternatively, it can be laminated to a sheet of clear acrylic or glass and placed into a fixed frame. However, the foregoing are only examples and are not to be construed as limitations on the present invention since any form of holder or support may be used.

The process of making a front projection screen embodiment is essentially the same as above and incorporates the printing step. However, in addition, reflecting element 7 (shown in phantom lines) is added to surface 1b of film 1. Suitable reflective materials include metals such as aluminum or silver, and suitable means for adding such a metallic layer include conventional vacuum deposition of aluminum, or conventional silver sputtering techniques.

For front projection screens, flexible o rigid substrate layer 5 need not be transparent if it is attached as the last layer facing away from the viewing audience.

As stated above, in order to increase the contrast in screens of the type under consideration, it has been known to add "blackness" to the screens. The blackness tends to increase the contrast by providing additional dark surface areas. As further noted above, the dark line pattern 3 of FIG. 1 is exemplary of the types of patterns that may be used to increase the contrast in the screen. Thus, FIGS. 2(a) through 2(j) show additional patterns that may be printed on the coating 2 to increase contrast.

Additionally, the term "dark pattern" as used herein is not confined to the use of black coloring. Any other color which adds darkness can be used, and the use of any particular color is dependant on the particular application to which the present invention is directed to.

There are various other possible arrangements of elements or method steps that one skilled in the art could substitute and obtain similar results as achieved herein; all of these possibilities are within the scope and spirit of this disclosure.

What is claimed is:

1. A method for making projection screens, comprising:

providing a thin plastic film;

printing onto said thin plastic film, a translucent coating; and further printing dark patterns onto said film to enhance the contrast of an image projected thereon.

2. The method of claim 1, wherein said translucent coating is a pigment which adds a milky-white translucent quality to said film.

3. The method of claim 1, wherein said step of printing dark patterns comprises printing evenly distributed, uniform, continuous dark patterns onto said film.

4. The method of claim 1, wherein said step of printing dark patterns comprises printing an irregularly distributed, uniform, continuous dark patterns onto said film.

5. A method for making projection screens, comprising:
providing a thin plastic film;
printing onto said thin plastic film, a translucent coating; and
attaching said film to a transparent substrate.

6. The method of claim 5, wherein said translucent coating is a pigment which adds a milky-white translucent quality to said screen.

7. A method of making rear-projection screens comprising:
providing a thin translucent plastic film;
printing pigments on a firs side of said film that add a milky-white translucent quality to said film to provide a printed pigment layer;
printing uniform, continuous dark patterns onto said first side of said film; and
adhesively attaching a transparent substrate layer to said film.

8. The method of claim 7, wherein said step of printing dark patterns comprises printing evenly distributed, uniform, continuous dark patterns onto said film.

9. The method of claim 7, wherein said step of printing dark patterns comprises printing an irregularly distributed, uniform, continuous dark patterns onto said film.

10. The method of claim 7, wherein said substrate is selected from the group comprising flexible substrates and rigid substrates.

11. The method of claim 7, wherein said printed pigment layer on said film form an optical diffusion coating on said first surface of said film.

12. The method of claim 7, further comprising an additional protective coating applied over both said printed dark pattern and said printed pigment layer on said film.

13. A method for making front-projection screens, comprising:
providing a thin plastic film;
printing pigments that add a milky-white translucent quality to the thin plastic film on a first side of said film;
printing uniform, continuous dark patterns onto said first side of said film;
attaching a layer of reflective material to said film; and
adhesively attaching a support substrate layer to said film.

14. The method of claim 13, wherein said printed pigments on said film form an optical diffusion coating on said first surface of said film.

15. The method of claim 13 wherein said step of printing dark patterns comprises printing evenly distributed, uniform, continuous dark patterns onto said film.

16. The method of claim 13 wherein said step of printing dark patterns comprises printing an irregularly distributed, uniform, continuous dark patterns onto said film.

17. The method of claim 13, further comprising the step of providing a protective coating over both said printed dark pattern and said printed pigment layer on said film.

18. The method of claim 13., wherein said substrate is selected from the group comprising flexible substrates and rigid substrates.

19. The method of claim 13, wherein said layer of reflective material is vacuum deposited aluminum.

20. The method of claim 13, wherein said layer of reflective material is sputtered silver.

21. A method of making a contrast enhancing element for a projection screen comprising:
providing a plastic film, and
printing on said film a dark pattern to enhance the contrast of an image projected on said film.

22. The method of claim 21, in which said pattern comprises a plurality of spaced dark lines.

23. The method of claim 22, in which the spacing between said lines is even.

24. The method of claim 23, in which the pattern is uneven to compensate for variations in contrast in the projected image.

25. The method of claim 24, including the step of printing an optical diffusion coating on said film.

26. The method of claim 25, including the step of attaching said film to a substrate.

27. A projection screen, comprising:
(a) a thin plastic film;
(b) a translucent coating printed on at least one surface of said plastic film; and
(c) an uniform dark pattern printed on at least one surface of said plastic film.

28. A projection screen, comprising:
a thin plastic film having a first surface;
a layer of printed, uniform patterns disposed on said first surface of said film;
a layer of printed pigments additionally disposed on said first surface of said film; and
a substrate layer adhesively attached to said film.

29. The apparatus of claim 28 wherein said printed, uniform patterns are evenly distributed over said film.

30. The apparatus of claim 28, wherein said printed, uniform patterns are irregularly distributed over said film.

31. The apparatus of claim 28, wherein said substrate is selected from the group comprising flexible substrates and rigid substrates.

32. The apparatus of claim 28, wherein said printed pigments form an optical diffusion coating layer on said first surface of said film.

33. The apparatus of claim 28, further comprising a layer of protective coating applied over both said printed dark pattern and said printed pigment layer.

34. A rear-projection screen, comprising:
a thin plastic film having a first surface, said first surface having a milky-white, translucent pigment layer printed thereon,
said first surface further having printed thereon uniform, continuous dark patterns; and
a transparent substrate layer adhesively attached to said film.

35. The apparatus of claim 34, wherein said patterns are evenly distributed over said film.

36. The apparatus of claim 34, wherein said patterns are irregularly distributed over said film.

37. A front-projection screen, comprising:
a thin film having a first surface;
a milky-white translucent pigment layer printed on said first surface;
uniform, continuous dark patterns printed on said first surface of said film;

a layer of reflective material attached to said film; and
a support substrate layer adhesively attached to said film.

38. The apparatus of claim 37, wherein said patterns are evenly distributed over said film.

39. The apparatus of claim 37: wherein said patterns are irregularly distributed over said film.

40. The apparatus of claim 37, wherein said pigment layer forms an optical diffusion coating layer on said first surface of said film.

41. The apparatus of claim 37, further comprising an additional protective coating layer applied over both said patterns and said pigment layer.

42. The apparatus of claim 37, wherein said substrate is selected from the group comprising flexible substrates and rigid substrates.

43. The apparatus of claim 37, wherein said layer of reflective material is vacuum deposited aluminum.

44. The apparatus of claim 37, wherein said layer of reflective material is sputtered silver.

45. A method of making a contrast enhancing element for a projection screen comprising:
providing a support material, and printing on said support material a dark pattern of spaced uniform elemental segments to enhance the contrast of an image projected on said support material.

46. The method of claim 45, in which said pattern comprises a plurality of spaced dark lines.

47. The method of claim 45, in which the distance between adjacent lines is different.

48. The method of claim 45, including the step of printing an optical diffusion coating on said support material.

49. The method of claim 45, in which said support material is a film.

50. The method of claim 49, including the step of attaching said film to a substrate.

51. A projection screen comprising a support upon which an image may be projected, and a pattern of dark lines printed on said support to enhance the contrast of the image projected thereon.

52. A projection screen as in claim 51, in which the spacing between adjacent lines is different for different pairs of adjacent lines.

53. A projection screen as in claim 51, and a diffusion coating printed on said support.

54. A projection screen as in claim 51, and a substrate connected to said support.

* * * * *